INVENTOR.
*Lubomyr O. Hewko*
BY
*A. M. Weiter*
ATTORNEY

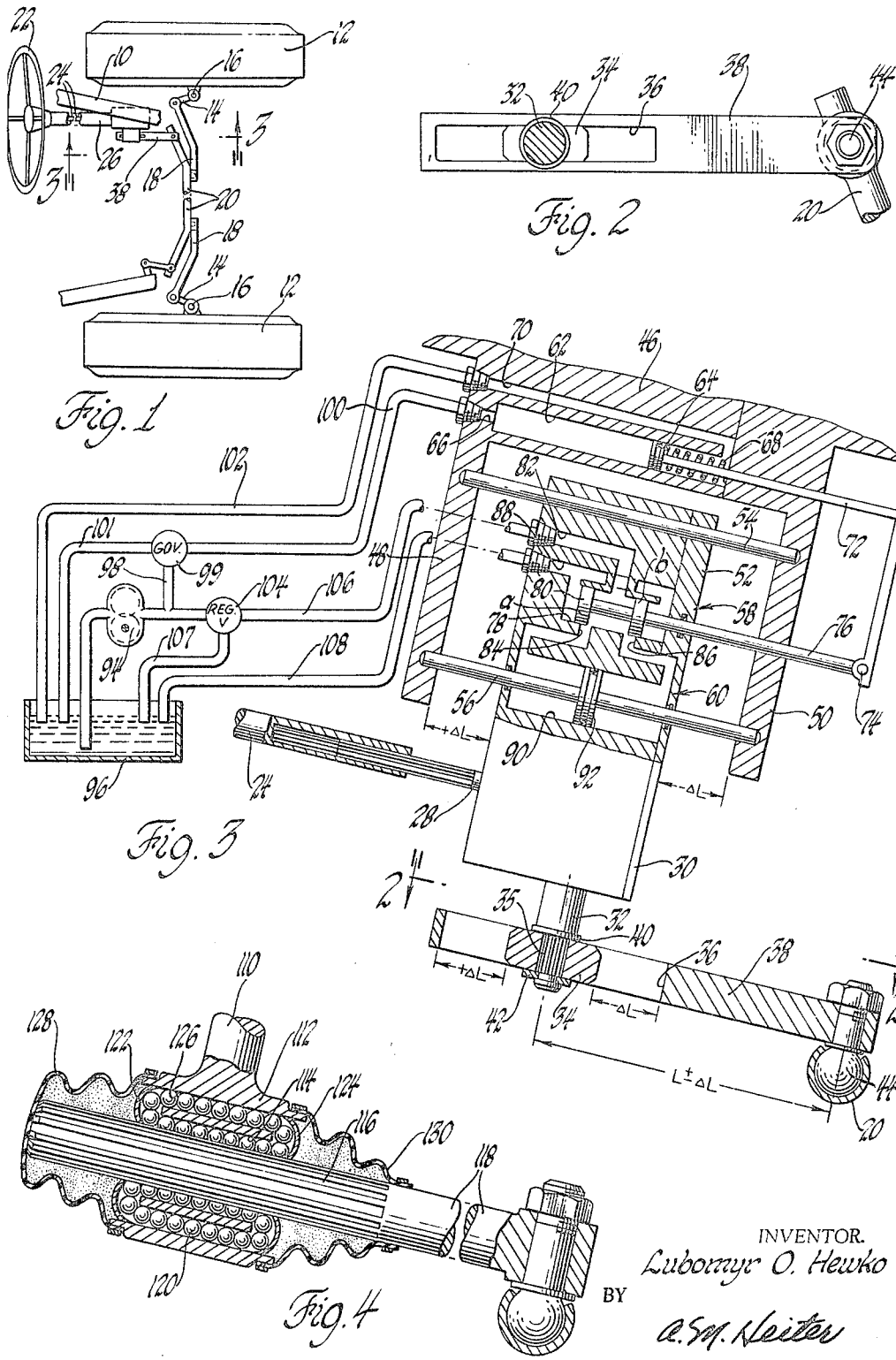

United States Patent Office 3,291,245
Patented Dec. 13, 1966

3,291,245
VEHICLE VARIABLE RATIO STEERING SYSTEM
Lubomyr O. Hewko, Warren, Mich., assignor to General Motors Corporation, Detroit, Mich., a corporation of Delaware
Filed July 31, 1964, Ser. No. 386,683
17 Claims. (Cl. 180—79.2)

This invention relates generally to steering systems for motor vehicles and more particularly to variable ratio steering systems whose steering ratios vary as a function of vehicle speed.

Better vehicle handling characteristics can be obtained by varying the overall steering ratio as a function of vehicle speed. This is noticeably apparent by observing that in present day vehicles having fixed ratio steering, with or without power assist, there must be a compromise made between a low steering ratio which is desirable for city driving and a high steering ratio which is desirable for highway driving.

One solution has been to provide a variable ratio steering system in which the overall steering ratio in the straight ahead vehicle direction is high and progressively reduces as the vehicle's front wheels are turned from their straight ahead directions. Such variable ratio steering systems only approach and never obtain the ideal which can only be obtained if the steering ratio is made to vary from a desired low to a desired high as some function of vehicle speed.

While the prior art has offered variable ratio steering systems in which the overall steering ratio is varied as a function of vehicle speed, these steering systems have imposed a new drive system as distinguished from changing the geometry of a conventional linkage system. Moreover, such steering systems have generally relied on the dynamics of a hydraulic control system as distinguished from a straightforward controlled displacement for varying the steering ratio through the steering linkage. Furthermore, such steering systems from an economical standpoint generally present high manufacturing costs because of their complicated structure.

This invention provides a variable ratio steering whose steering ratios vary as a function of vehicle speed and are effected by changing the geometry of a conventional steering linkage. More particularly, the steering system of this invention in embodimental form employs a servomechanism controlled by a control signal indicative of vehicle speed which is operable to vary the effective working radius of the pitman arm. The servomechanism includes a servovalve controlled by the speed signal controlling a servomotor which is operatively connected to vary the effective pitman arm radius. At low speeds the servovalve controls the supply of a regulated pressure to the servomotor to condition the effective pitman arm radius to provide a low steering ratio. As vehicle speed increases the speed signal signals the servomechanism to decrease the effective pitman arm radius so that higher steering ratios are provided. Thus, at low speeds it takes only a small part of a revolution of the steering wheel to produce a large steering angle while at high speeds, for the same revolution of the steering wheel, a correspondingly smaller steering angle is produced.

An object of this invention is to provide a variable ratio steering system operable to change the geometry of a steering linkage as a function of a vehicle performance indicator.

Another object of this invention is to provide a speed responsive servomechanism operable to vary the geometry of a conventional steering linkage to provide steering ratios which vary as a function of vehicle speed.

Another object of this invention is to provide a speed responsive servomechanism operable to control the effective working radius of a control linkage member to vary the overall steering ratio as a function of vehicle speed.

Another object of this invention is to provide a variable ratio steering system having a speed responsive servomechanism operable to vary the effective working radius of the steering linkage pitman arm as a function of vehicle speed so as to provide a low steering ratio at a low vehicle speed and progressively higher steering ratios at higher speeds within finite speed limits.

These and other objects of the invention will be more apparent from the following description and drawing in which:

FIGURE 1 is a plan view showing the steering linkage in the front end of a vehicle in which is incorporated one embodiment of the invention.

FIGURE 2 is an enlarged elevational view of a portion of FIGURE 1 showing the pitman arm.

FIGURE 3 is an enlarged elevational view taken substantially on the line 3—3 in FIGURE 1 showing parts in section.

FIGURE 4 is a modification of the pitman arm shown in FIGURES 2 and 3.

Figure 5:
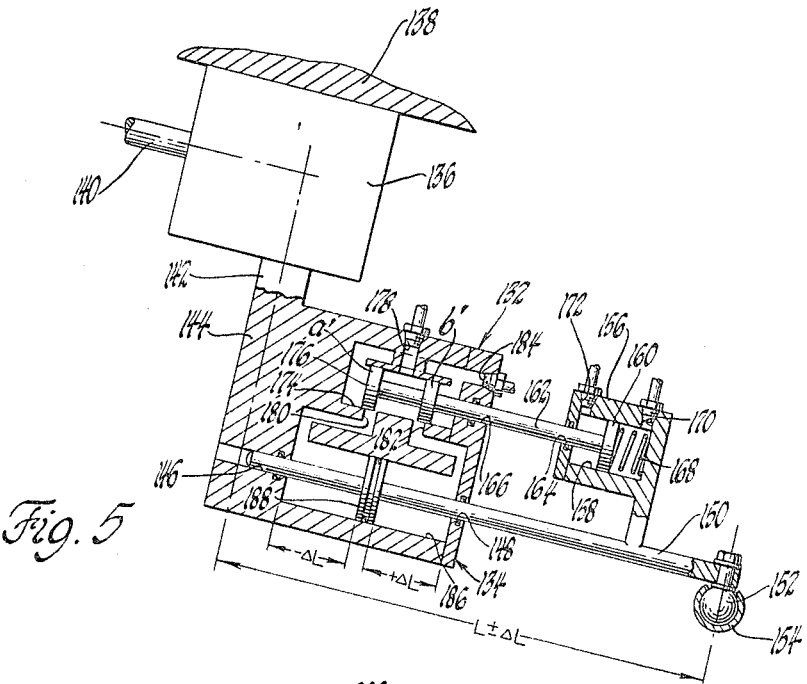
FIGURE 5 is an elevational view of another embodiment of the invention showing parts in section.

Referring to the drawing and FIGURE 1, there is shown a front portion of a vehicle chassis 10 having suitable suspension linkage, not shown, on which the front wheels 12 are rotatably supported by spindles carried by steering knuckles having knuckle arms 14 piovtally mounted on the usual king pins 16. The knuckle arms 14 are connected by tie rods 18 to an intermediate rod 20 whose lengthwise movement produces pivoting of the wheels 12 and turning of the vehicle.

Movement is imparted to intermediate rod 20 by a steering wheel 22 rigidly connected to a steering shaft 24 which is rotatably supported and fixed against axial movement in a steering column 26 rigidly secured to the chassis 10. As best shown in FIGURE 3, the lower end of steering shaft 24 has an end bore splined to accept the external splines of a steering box input shaft 28 of a steering box 30 which is of a conventional design, with or without power assist. The splines connecting shafts 24 and 28 while preventing relative rotation therebetween permit axial movement of shaft 28 and connected gear box 30 relative to shaft 24 for reasons which will become more apparent in the description of steering ratio change.

Upon rotation of steering wheel 22 and connected shafts 24 and 28 rotary motion is imparted in the conventional manner through the operation of gear box 30 to a pitman shaft 32 whose axis is located perpendicular to input shaft 28. As best shown in FIGURES 2 and 3, a rectangular element 34 secured by splines 35 to the end of pitman shaft 32 is slidably mounted in an elongated slot 36 provided in the pitman arm 38 so that any rotary movement imparted to pitman shaft 32 is transmitted by this sliding connection to the pitman arm. Element 34 is retained in slot 36 by a shaft collar 40 and a retainer ring 42 retained on the end of pitman shaft 32. The working end of pitman arm 38 is pivotally secured by a ball and socket connection 44 to the intermediate rod 20 whereby rotary motion of pitman arm 38 produces the lengthwise movement of the intermediate rod 20.

Since the effective working radius of pitman arm 38 designated by the dimension L determines the relationship between angular movement of pitman shaft 32 and lengthwise movement of intermediate rod 20, any increase or decrease in pitman arm radius is effective to change the overall steering ratio. The sliding connection between pitman shaft 32 and pitman arm 38 permits this change in radius since slot 36 is in line with the pitman arms spaced connections. Radius increases from the mean shown in FIGURES 2 and 3 within the limit $+\Delta L$ determined by the spacing between element 34 and one end of slot 36 serves to decrease the overall steering ratio while radius decrease within an equal limit $-\Delta L$ determined by the spacing between element 34 and the opposite end of slot 36 serves to increase the overall steering ratio.

The means for enabling and controlling the sliding movement between pitman shaft 32 and pitman arm 38 comprise a support structure 46 rigidly secured to the chassis 10 having a pair of depending legs 48 and 50. A valve and motor body 52 integral with the steering box 30 is slidably mounted on a pair of support rods 54 and 56 supported by the legs 48 and 50, such rods being arranged parallel with the axes of shafts 24 and 28 whereby sliding movement of valve and motor body 52 and gear box 30 is in the axial direction of these shafts and enables the permissive movement between pitman shaft 32 and pitman arm 38 which is controlled by the speed responsive servomechanism now to be described.

The servomechanism comprises a servovalve generally designated at 58 responsive to a speed controlled signal to control the operation of a servomotor generally designated at 60 which operates to position the gear box 30 on the support rods 54 and 56 in relationship to vehicle speed within a finite speed range.

Referring first to the servovalve 58, the support structure 46 also serves as a valve body providing a bore 62 in which is slidably mounted a control piston 64. A signal passage 66 permits the delivery of a signal pressure to the left-hand end of this bore and a spring 68 positioned in the bore's right-hand end acts on piston 64 to resist signal pressure with an exhaust passage 70 ported to the bore's right-hand end serving to exhaust any leakage past piston 64. A relay control rod 72 rigidly connected to piston 64 is slidably and sealingly mounted in a bore in support structure 46 with such rod extending through the support and then making a right-angle bend free of the support. A pin 74 connects the terminal end of rod 72 to a rod 76 which is slidably received in axially aligned bores provided in depending leg 50 and the valve and motor body 52.

In valve and motor body 52, there is provided a bore 78 in which is slidably mounted a spool valve element 80 rigidly connected to the left-hand end of rod 76 having spaced lands $a$ and $b$ and the rod 76 is sealingly mounted in its supporting bore in body 52 to prevent leakage from the right-hand end of bore 78. A regulated pressure supply passage 82 is connected between lands $a$ and $b$ in one spool valve position to a motor port 84, is connected between the lands $a$ and $b$ in another spool valve position to another motor port 86 and is connected between lands $a$ and $b$ in a center or intermediate spool valve position to both motor ports 84 and 86 as shown in FIGURE 3. An exhaust passage 88 is ported to the left and right-hand ends of bore 78 for exhausting motor port 84 when that port is uncovered by land $a$ and for exhausting motor port 86 when that port is uncovered by land $b$.

The servomotor 60 has a bore 90 in body 52 in which is mounted a piston 92 rigidly secured to support rod 56 at the latter's midpoint. Motor ports 84 and 86 are ported to the left and right-hand ends of bore 90 and suitable seals are provided in valve and motor body 52 to prevent leakage from bore 90 past support rod 56.

Movement of gear box 30 and thus pitman shaft 32 to change the pitman arm radius is controlled by the positioning of control piston 64 through the action of signal pressure. One such signal pressure may be transmission governor pressure which is indicative of vehicle speed and it will be recognized that other suitable signal pressures such as could be provided by an axle driven pump can be used in vehicles not having an automatic transmission in addition to control devices such as force transducers, electric motors and solenoids which could be employed to control the positioning of the control piston 64 as a function of vehicle speed and in the manner to be described.

To illustrate, it will be assumed that transmission governor pressure is available and as such there is shown an output driven transmission pump 94 receiving fluid from a sump 96 and delivering this fluid under pressure to a main line 98 where a suitable governor valve 99 controlled by vehicle speed delivers governor pressure to a signal line 100 connected to signal passage 66 and returns overage via an exhaust line 101 to sump 96. An exhaust line 102 connects exhaust passage 70 to sump 96. A governor of the type shown in the Hewko Patent No. 2,941,539, issued June 21, 1960, may be employed, such governor developing a governor pressure that varies as a linear function of the change in speed or other desired functions thereof.

Fluid pressure for operating the servomotor 60 is supplied by a conventional regulator valve 104 serviced by the main line 98, such regulator valve delivering a regulated pressure to supply line 106 connected to supply passage 82 and returning overage via an exhaust line 107 to sump 96. An exhaust line 108 connects exhaust passage 88 to sump 96.

Describing now the operation of the variable ratio steering system provided it will be observed first that the spacing between depending leg 48 and gear box 30 is equal to $+\Delta L$ and the spacing between gear box 30 and depending leg 50 is equal to $-\Delta \Delta L$. Thus, in this gear box position the effective pitman arm radius L provides a steering ratio midway between its low and high ratios and can be increased by an amount $+\Delta L$ to provide the lowest ratio and can also be decreased by a like amount $-\Delta \Delta L$ to provide the highest ratio all within the speed range selected. In this gear box position, it will be assumed that the speed of the vehicle is initially constant and midway between the low and high speed limits selected. With the speed constant, the pressure forces acting on the opposite ends of bore 90 are equal and hold the gear box 30 in the position shown since under these conditions the spool valve element 80 is at its center position to communicate the regulated pressure via motor parts 84 and 86 with both sides of piston 92.

Then as vehicle speed increases, the signal pressure supplied by governor valve 99 which increases with vehicle speed at the rate determined by governor operation urges the spring loaded control piston 64 rightwardly. Control piston 64 moves under the influence of signal pressure until the force of the spring 68 balances the signal pressure force with the exhaust passage 70 exhausting any leakage past the piston to the sump 96. Movement of control piston 64 acting through linkage 72 and 76 moves spool valve element 80 rightwardly to position land $b$ to further open motor port 86 to the regulated pressure while at the same time land $a$ closes motor port 84 to the regulated pressure and connects this motor port to the left-hand end of bore 78 and connected exhaust passage 88 to relieve the pressure in the left-hand end of bore 90. The resultant pressure force acting on the right-hand end of bore 90, remembering that piston 92 is rigid with support rod 56 to provide reaction, gradually moves gear box 30 in the direction of this force until motor port 86 is closed to the regulated pressure and opened to exhaust by land $b$ a motor port 84 is connected between lands $a$ and $b$ to supply passage 82 and the regulated pressure. The resultant pressure in the left-hand end of bore 90 then moves gear box 30 in the direction of this force until motor port 86 is opened to the regulated pressure and closed to exhaust by land $b$ and motor port 86 is closed to the regulated pressure and opened to exhaust by land $a$ to relieve the pressure in the left-hand end of bore 90. This reciprocating movement of gear box 30 continues until equilibrium is reached between the pressure forces acting on the opposite ends of bore 90, such pressure forces then again being provided by full regulated pressure. The position of gear box 30 relative to control piston 64 and connected spool valve element 80 will be the same as it was before control piston 64 was moved as a result of the increase in signal pressure. Thus, gear box 30 will always follow the movement of control piston 64 which in this instance has been moved rightwardly to decrease the effective pitman arm radius thereby increasing the overall steering ratio as a function of vehicle speed until the upper limit of speed control is reached which corresponds to a minimum highway speed and beyond which the steering ratio remains constant at its high valve.

In like manner, as signal pressure decreases with decreasing vehicle speed, spring 68 urges control piston 64 leftwardly thereby effecting leftward movement of spool valve element 80 which by its control of servomotor 60 moves gear box 30 leftwardly to maintain the positioning between the gear box 30 and control piston 64 as previously described with such decreasing signal pressure increasing the effective pitman arm radius as a function of vehicle speed to provide lower overall steering ratios at the lower speeds with the lowest control speed corresponding to a maximum city speed and below which the steering ratio remains constant at its low value.

A modification of the sliding connection between the pitman shaft and pitman arm is shown in FIGURE 4 in which a modified pitman shaft 110 has an integral male ball spline body 112 having internal straight ball grooves 114 complementary to straight ball grooves 116 provided on the modified pitman arm 118. Balls 120 loaded in each pair of complementary grooves 114 and 116 complete the antifriction sliding connection between pitman shaft 110 and pitman arm 118. Ball return guides 122 and 124 mounted on body 112 at the opposite ends of grooves 114 return the balls 120 via return passages 126 from the unloading ends of the working straight ball races to the loading ends to provide ball circulation and rubber boots 128 and 130 serve to protect the antifriction connection from foreign material.

Referring to FIGURE 5, there is shown a more compact servomechanism comprising a servovalve generally designated at 132 and a servomotor generally designated at 134 utilizing the same basic principles of hydraulic operation as the embodiment shown in FIGURE 3.

Here the steering gear box 136 is rigidly secured to the vehicle chassis 138 as in the conventional manner to simplify adaptation of the invention to a conventional steering assembly installation. Rotation of steering box input shaft 140 is imparted by gear box 136 to the pitman shaft 142 which has integral therewith a valve and motor body 144. In body 144 there are provided axially aligned bores 146 and 148 whose axes are arranged perpendicular to the pitman shaft axis with such bores slidably supporting a rod-type pitman arm 150 having a ball and socket connection 152 with the intermediate rod 154 of the steering linkage.

Intermediate body 144 and connection 152 there is provided a separate control valve body 156 rigidly connected to the pitman arm 150 having a bore 158 in which is slidably mounted the control piston 160 of the servovalve 132. Rigidly connected to control piston 160 is control rod 162 which is slidably mounted in axially aligned bores 164 and 166 in valve bodies 156 and 144 respectively. A spring 168 mounted in the right-hand end of bore 158 resists movement of control piston 160 by signal pressure supplied via a signal supply passage 170 ported to the bore's left-hand end and an exhaust passage 172 is provided to exhaust any leakage past the control piston.

In valve body 144, there is provided a bore 174 in which is slidably mounted a spool valve element 176 rigidly connected to the left-hand end of control rod 162 having lands $a'$ and $b'$. Like the valve assembly shown in FIGURE 3, a regulated pressure supply passage 178 is connected between lands $a'$ and $b'$ to a motor port 180 in one spool valve position, to a motor port 182 in another spool valve position and to both motor ports 180 and 182 in an intermediate spool valve position as shown in FIGURE 5. An exhaust passage 184 ported to the left- and right-hand ends of bore 174 serves to exhaust motor port 180 when uncovered by land $a'$ and to exhaust motor port 182 when uncovered by land $b'$.

Motor ports 180 and 182 are ported to the left- and right-hand ends of a bore 186 in which is slidably mounted the motor piston 188. Motor piston 188 is rigidly connected to the slidably movable pitman arm 150 so as to impart movement to the pitman arm when acted on by the pressure forces in bore 186 since in this instance, in contrast with the servomotor structure of FIGURE 3, the valve body 144 takes the reaction and the piston 188 provides motor output. Thus, the motor piston 188 and pitman arm 150 move as a unit and their relative position determines the effective pitman arm radius whose dimension is L and is changeable from the means shown by an amount $\pm \Delta L$ as a function of vehicle speed.

The basic hydraulic operations of servovalve 132 and servomotor 134 are the same as those of servovalve 58 and servomotor 60 previously described and therefore are not repeated here recognizing that control piston 160 when in its signaled position moves conjointly with pitman arm 150 and connected piston 188 to control motor port opening and closing and thus the positioning of piston 188 in its bore since the signal pressure force and spring force acting on control piston 160 are oppositely acting and equal.

Figure 6:
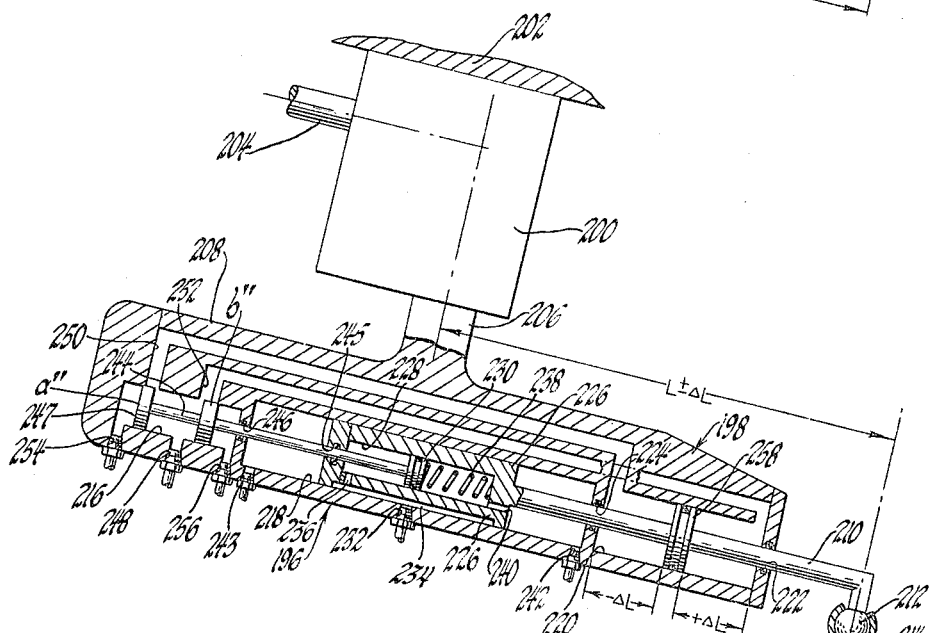
FIGURE 6 is an elevational view of another embodiment of the invention showing parts in section.

The servomechanism shown in FIGURE 6 has an even more compact unit than the unit shown in FIGURE 5 and comprises a servovalve generally designated at 196 and a servomotor generally designated at 198 utilizing the same basic principles of hydraulic operation as the embodiment shown in FIGURE 3.

Here again the steering gear box 200 is rigidly secured to the vehicle chassis 202 as in the conventional manner. Rotation of steering box input shaft 204 is imparted by gear box 200 to the pitman shaft 206 which has integral therewith a valve and motor body 208, such valve and motor body slidably supporting, as will be described in greater detail, a rod-type pitman arm 210 having a ball and socket connection 212 with the intermediate steering linkage rod 214 and whose sliding movement is perpendicular to the axis of pitman shaft 206.

In body 208 there is provided three separate axially aligned bores 216, 218 and 220 in that order running perpendicular to the pitman shaft axis. The pitman arm 210 which is slidably mounted in axially aligned bores 222 and 224 in body 208, extends through bore 220 and is rigidly connected at its left-hand end to a control valve body 226 slidably mounted in bore 218. Valve body 226 has a bore 228 in which is slidably mounted the control piston 230 of the servovalve assembly. Signal pressure is communicated to the left-hand end of bore 228 via a signal pressure supply passage 232 in body 208, a recess 234 in the exterior of valve body 226 and a port 236. A spring 238 resists movement of control piston 230 by signal pressure and any leakage past control piston 230 is exhausted via an exhaust port 240 in valve body 226, the right-hand end of bore 218 and an exhaust port 242 which exhausts the right-hand end of bore 218. An exhaust port 243 exhausts the left-hand end of bore 218 of any leakage to this bore end.

Rigidly connected to control piston 230 is the control rod 244 which is slidably mounted in axially aligned bores 245 and 246 in valve bodies 226 and 208 respectively. In bore 216 there is slidably mounted a spool valve element 247 rigidly secured to the left-hand end of the extending control rod 244 having lands $a''$ and $b''$. Like the valve assembly shown in FIGURE 3, a regulated pressure supply passage 248 is connected between lands $a''$ and $b''$ to a motor port 250 in one spool valve position, to a motor port 252 in another spool valve position and to both motor ports 250 and 252 in an intermediate spool valve position as shown in FIGURE 6. An exhaust port 254 ported to the left-hand end of bore 216 serves to exhaust motor port 250 when the latter is uncovered by land $a''$ and an exhaust port 256 serves to exhaust motor port 252 when the latter is uncovered by land $b''$.

Motor ports 250 and 252 are ported to the left- and right-hand ends of bore 220 in which is slidably mounted a motor piston 258. Motor piston 258 is rigidly secured to the slidably movable pitman arm 210 so as to impart movement to the pitman arm when acted on by the pressure forces in bore 220 since again in this instance body 208 takes the reaction. Thus, like the servomechanism shown in FIGURE 5, the motor piston 258 and pitman arm 210 move as a unit and their relative position determines the effective pitman arm radius whose dimension is L and is changeable from the mean shown by an amout $\pm \Delta L$ as a function of vehicle speed.

The coaxial location of the control piston 230, the spool valve element 247 and the motor piston 258 provide a much smaller overall package. The basic hydraulic operations of the servovalve 196 and the servomotor 198 are the same as those of servovalve 58 and servomotor 60 previously described and therefore are not repeated here recognizing again that control piston 230 when in its signaled position moves conjointly with the pitman arm 210 and connected piston 258 to control motor port opening and closing and thus the positioning of piston 258 in its bore since the signal pressure force and spring force acting on control piston 230 are oppositely acting and equal.

The above-described preferred embodiments are illustrative of the invention which may be modified within the scope of the appended claims.

I claim:
1. In a vehicle having steering linkage including an angularly moveable member, a linkage member whose effective length is a function of the overall steering linkage ratio, means operatively connecting said members for conjoint angular movement and for permitting relative transverse movement to vary the effective length of said linkage member, a servomechanism operatively connected to one of said members operable to effect relative transverse movement between said members and said servomechanism including means responsive to vehicle speed to control the operation of said servomechanism so that the overall steering linkage ratio is varied as a function of vehicle speed.

2. The structure set forth in claim 1 and said linkage member being a pitman arm.

3. In a vehicle chassis having steering linkage including a pitman arm, a servomotor operable to vary the effective radius of said pitman arm and a servovalve responsive to vehicle speed to control the operation of said servomotor so that the effective length of said pitman arm is varied as a function of vehicle speed.

4. The structure set forth in claim 3 and said steering linkage further including a steering gear box slidably mounted on said vehicle chassis and having a pitman shaft, means slidably connecting said pitman arm to said pitman shaft whereby the effective radius of said pitman arm may be varied upon sliding movement of said steering gear box and said servomotor being operatively connected to said steering gear box and being operable to move said steering gear box in response to control by said servovalve.

5. The structure set forth in claim 3 and said steering linkage further including a pitman shaft, said servovalve and said servomotor being supported by said pitman shaft and said servomotor operatively connecting said pitman arm to said pitman shaft and being operable to move said pitman arm transverse to the axis of said pitman shaft to vary the effective radius of said pitman arm.

6. The structure set forth in claim 5 and said servomotor, said servovalve and said pitman arm being concentrically arranged.

7. A steering system for a vehicle comprising a steering gear box having a pitman shaft, a pitman arm, means operatively connecting said pitman shaft and said pitman arm for conjoint angular movement and for permitting relative transverse movement and means responsive to vehicle speed operable to effect relative transverse movement between said pitman shaft and said pitman arm to vary the effective pitman arm radius as a function of vehicle speed to provide a maximum radius at a preselected low vehicle speed which decreases with increasing vehicle speed to provide a minimum radius at a preselected high vehicle speed.

8. A steering system for a vehicle comprising a steering gear box having a pitman shaft, a pitman arm, means operatively connecting said pitman shaft and said pitman arm for conjoint angular movement and for permitting relative transverse movement and means responsive to vehicle speed operable to effect relative transverse movement between said pitman shaft and said pitman arm to vary the pitman arm radius to provide an effective variable pitman arm radius which varies inversely with vehicle speed within finite radius and speed limits.

9. A steering system for a vehicle comprising a steering gear box having a pitman shaft, a pitman arm, means operatively connecting said pitman shaft to said pitman arm so as to prevent relative rotation between said pitman shaft and said pitman arm while permitting transverse movement of said pitman shaft and steering gear box relative to said pitman arm whereby the effective pitman arm radius may be varied and means responsive to vehicle speed operable to move said steering gear box including said pitman shaft relative to said pitman arm to provide an effective pitman arm radius which varies inversely with vehicle speed within selected radius and speed limits.

10. The steering system set forth in claim 9 and said means connecting said pitman shaft to said pitman arm being a recirculating ball spline connection.

11. In a steering system for a vehicle having a chassis; a steering shaft, a steering gear box having operatively connected input and pitman shafts, means connecting said steering shaft and said input shaft operable to prevent relative rotation and permit sliding movement of said input shaft and said steering gear box relative to said steering shaft, means operatively connecting said pitman shaft to said pitman arm operable to prevent relative rotation and permit transverse movement of said pitman shaft relative to said pitman arm to shift the point of connection between said pitman shaft and said pitman arm to vary the effective pitman arm radius, means including a support member slidably supporting said steering gear box on said chassis to enable the sliding movement of said input shaft and said steering gear box relative to said steering shaft and the transverse movement of said pitman shaft relative to said pitman arm, a servovalve responsive to vehicle speed and a servomotor controlled by said servovalve and being operable to move said steering gear box along said support member so that the effective pitman arm radius is varied inversely with vehicle speed within a finite speed range and between finite radius limits.

12. In a steering system for a vehicle having a chassis;

a steering shaft, a steering gear box having operatively connected input and pitman shafts, means connecting said steering shaft and said input shaft operable to prevent relative rotation and permit sliding movement of said input shaft and said steering gear box relative to said steering shaft, means operatively connecting said pitman shaft to said pitman arm operable to prevent relative rotation and permit transverse movement of said pitman shaft relative to said pitman arm to shift the point of connection between said pitman shaft and said pitman arm to vary the effective pitman arm radius, means including a support member slidably supporting said steering gear box on said chassis to enable the sliding movement of said input shaft and said steering gear box relative to said steering shaft and the transverse movement of said pitman shaft relative to said pitman arm, a servovalve responsive to vehicle speed, a servomotor controlled by said servovalve and being operable to move said steering gear box along said guide member so that the effective pitman arm radius is varied inversely with vehicle speed within a finite speed range and between finite radius limits, said servovalve including a valve body rigidly secured to said chassis and containing a control piston, a valve body rigidly secured to said steering gear box containing a delivery and exhaust valve operatively connected to said control piston for conjoint movement therewith, said servomotor including a motor body rigidly secured to said steering gear box having a motor piston rigidly connected to said support member and exposed on opposite sides to a pair of motor chambers provided in said motor body, a signal pressure which varies as a function of vehicle speed, a regulated pressure, said control piston being responsive to said signal pressure to move said delivery and exhaust valve from an intermediate position relative to its valve body in one direction as said signal pressure increases and to move said delivery and exhaust valve from said intermediate position in the opposite direction as said signal pressure decreases, said delivery and exhaust valve being operable in said intermediate position to deliver said regulated pressure to both said motor chambers whereby the pressure forces acting in both said motor chambers are in equilibrium and hold said steering gear box stationary relative to said control piston and connected support member, said delivery and exhaust valve when moved from said intermediate position in either of said directions by said control piston in response to signal pressure change being operable to continue delivering regulated pressure to one of said motor chambers and to exhaust the other of said motor chambers so as to provide a pressure force differential between said motor chambers which causes said steering gear box to move in the direction of the resultant force which is in a direction effective to decrease the effective pitman arm radius as said signal pressure increases and is in the opposite direction to increase the effective pitman arm radius as said signal pressure decreases and said delivery and exhaust valve being operable in the position to which it has been moved to reestablish its intermediate position in its bore and equilibrium between the pressure forces in said motor chambers whereby said steering gear box is again held stationary relative to said support member to provide either a decreased or increased effective pitman arm radius dependent on the signal pressure acting on said control piston.

13. The steering system set forth in claim 12 and said vehicle including a transmission having an output driven governor and said signal pressure being provided by said governor.

14. In a steering system for a vehicle having a chassis; a steering gear box rigidly secured to said chassis and having a pitman shaft, a pitman arm, a servomotor operatively connecting said pitman arm to said pitman shaft operable to prevent relative rotation and permit transverse movement of said pitman arm relative to said pitman shaft to vary the effective pitman arm radius, and a servovalve responsive to vehicle speed operable to control said servomotor so that the pitman arm radius is varied inversely with vehicle speed within a finite speed range and between finite radius limits.

15. In a steering system for a vehicle having a chassis; a steering gear box rigidly secured to said chassis and having a pitman shaft, a pitman arm, a servomotor operatively connecting said pitman arm to said pitman shaft operable to prevent relative rotation and permit transverse movement of said pitman arm relative to said pitman shaft to vary the effective pitman arm radius, a servovalve responsive to vehicle speed operable to control said servomotor so that the pitman arm radius is varied inversely with vehicle speed within a finite speed range and between finite radius limits, said servovalve including a valve body rigidly secured to said pitman arm and containing a control piston, a valve body rigidly secured to said pitman shaft containing a delivery and exhaust valve operatively connected to said control piston for conjoint movement therewith, said servomotor including a motor body also rigidly secured to said pitman shaft having a motor piston rigidly connected to said pitman arm and exposed on opposite sides to a pair of motor chambers provided in said motor body, a signal pressure which varies as a function of vehicle speed, a regulated pressure, said control piston being responsive to said signal pressure to move said delivery and exhaust valve from an intermediate position relative to its valve body in one direction as said signal pressure increases and to move said delivery and exhaust valve from said intermediate position in the opposite direction as said signal pressure decreases, said delivery and exhaust valve being operable in said intermediate position to deliver said regulated pressure to both said motor chambers whereby the pressure forces acting in both said motor chambers are in equilibrium and hold said motor piston and connected pitman arm stationary in said motor body, said delivery and exhaust valve when moved from said intermediate position in either of said directions by said control piston in response to signal pressure change being operable to continue delivering regulated pressure to one of said motor chambers and to exhaust the other of said motor chambers so as to provide a pressure force differential between said motor chambers which causes said motor piston and connected pitman arm to move in the direction of the resultant force which is in a direction effective to decrease the effective pitman arm radius as said signal pressure increases and is in the opposite direction to increase the effective pitman arm radius as said signal pressure decreases and said delivery and exhaust valve being operable in the position to which it has been moved to reestablish its intermediate position in its bore and equilibrium between the pressure forces in said motor chambers whereby said motor piston and connected pitman arm are again held stationary relative to said motor body to provide either a decreased or increased effective pitman arm radius dependent on the signal pressure acting on said control piston.

16. The steering system set forth in claim 15 and said control piston, said delivery and exhaust valve and said motor piston being concentrically arranged.

17. In a vehicle having steering linkage including a linkage member whose effective length is a function of the overall steering linkage ratio, a servomechanism operable to vary the effective length of said linkage member, said servomechanism including means responsive to vehicle speed to control the operation of said servomechanism so that the overall steering linkage ratio is varied as a function of vehicle speed, and said servomechanism further including a servomotor operatively connected to said linkage member so as to vary the effective length upon controlled pressure supply and exhaust, a regulated pressure source and said means including a vehicle speed responsive servovalve operable to control pressure supply from said source to said servomotor and to control pressure exhaust in response to vehicle speed change whereby the operation of said servomotor is controlled to vary the effective length as a function of vehicle speed.

References Cited by the Examiner

UNITED STATES PATENTS

| | | | |
|---|---|---|---|
| 2,341,502 | 2/1944 | Ingres | 180—79.2 |
| 2,356,492 | 8/1944 | Smith | 180—79.2 |
| 2,676,663 | 4/1954 | Smith | 280—95 X |
| 2,734,589 | 2/1956 | Groen | 91—458 X |
| 2,996,136 | 8/1961 | Nallinger et al. | 180—79.2 |
| 3,085,645 | 4/1963 | Bookout et al. | 180—79.2 |

FOREIGN PATENTS 1,127,236           Germany.

KENNETH H. BETTS, *Primary Examiner.*